Patented Apr. 15, 1952

2,593,249

UNITED STATES PATENT OFFICE 2,593,249

$\Delta^{7,9}$-ANDROSTADIENES AND METHOD OF PREPARING THE SAME

Seymour Bernstein, Pearl River, N. Y., and Dominic J. Giancola, Jersey City, N. J., assignors to American Cyanamid Company, New York, N. Y., a corporation of Maine No Drawing. Application May 8, 1951, Serial No. 225,272

9 Claims. (Cl. 260—397.5)

1

This invention relates to new chemical compounds. More particularly, it relates to 3,17-disubstituted androstadienes, esters thereof and methods of preparing the same.

Recent medical and chemical literature contain numerous articles on cortisone and related steroids. Cortisone may be described chemically as $\Delta^{4,5}$-3,11,20-triketo-17$\alpha$,21-dihydroxy pregnene. Cortisone has been found highly active in the treatment of arthritis, rheumatic fever, severe burns and other pathological conditions. The present commercial synthesis of cortisone is based on bile acids as starting material. Bile acids are of animal origin and therefore are in short supply. Therefore, a great deal of research is being carried out looking towards other compounds which may have similar activity or new methods of synthesis for cortisone itself. Several compounds having a chemical structure related to cortisone have been reported to have cortisone-like activity.

It has now been found that certain 3,17-disubstituted androstadienes may be useful in preparing physiologically active compounds. The compounds of the present invention may be illustrated by the following general formula:

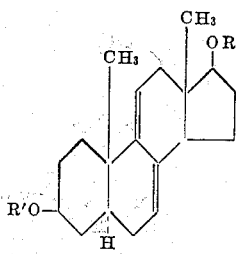

in which R and R' are members of the group consisting of hydrogen, lower alkyl carbonyl and benzoyl radicals.

These compounds are generally crystalline with relatively high melting points and are soluble in the usual organic solvents. They can be purified by recrystallization from lower aliphatic alcohols or mixtures of these alcohols with water.

The compounds of the present invention can be prepared by heating a 3,17-disubstituted-$\Delta^7$-androstene with mercuric acetate and acetic acid in the presence of a lower aliphatic alcohol. The 3,17-disubstituted-$\Delta^7$-androstenes are dissolved in a lower aliphatic alcohol and the mercuric acetate in solution along with glacial acetic acid is added

2 thereto. The mixture is heated preferably at refluxing temperatures in order to complete the reaction and subsequently the product is recovered therefrom.

The 3,17-disubstituted-$\Delta^7$-androstenes used as intermediates in the present invention are new compounds which are described and claimed in a copending application of one of us, Serial Number 209,906, filed February 7, 1951. A representative method of preparing these compounds is also described in the examples hereinafter. In the general formula given above R and R' can be radicals such as acetyl, propionyl, butyryl or similar alkyl carbonyl radicals.

In carrying out the process of the present invention we prefer to heat the reaction mixture at a temperature of from about 50° C. to about 125° C. At the above temperature the reaction is usually completed within a period of from about 10 minutes to 2 hours.

Upon completion of the reaction the desired product is recovered by filtering off the mercurous acetate, removing the solvent and evaporating the mixture under reduced pressure. The residue is then dissolved in an organic solvent, filtered and again evaporated. The final product, when recrystallized from a lower aliphatic alcohol, usually gives a solid crystalline product having a different melting point.

In the examples hereinafter the general reaction is shown as having been carried out with $\Delta^7$-androstene in which R and R' are hydrogen. It is obvious, however, that the same reaction can be carried out in a similar manner when R and R' of the general formula are lower alkyl carbonyl radicals.

The compounds of the present invention are useful in the field of pharmaceuticals and may serve as intermediates in the preparation of compounds having cortisone-like activity.

The invention will be described in greater detail in the following examples wherein representative compounds within the scope of the general reaction are prepared.

Example 1

To a solution of 3.48 g. of $\Delta^5$-androsten-3$\beta$,17$\beta$-diol diacetate in 50 ml. of carbon tetrachloride is added 75 ml. of petroleum ether (boiling point 64–66°, freed of unsaturates) and 1.99 g. of N-bromosuccinimide. The mixture is refluxed and irradiated by the heat and light of one photospot lamp (Type 2, General Electric Co.), for 5 minutes. To the still refluxing mixture is added 7.5 ml. of s-collidine. The mixture is cooled and the solid separated by filtration. The filtrate is evaporated under reduced pressure and the residue is treated with 100 ml. of xylene. The mixture is refluxed in a nitrogen atmosphere for 15 minutes, cooled and filtered. The filtrate is evaporated under reduced pressure in a nitrogen atmosphere and gives an oily residue which is dissolved in methanol and precipitated with water. This gives oily crystals which on recrystallization successively from dilute methanol, methanol and dilute methanol gives 0.88 g. of pure $\Delta^{5,7}$-androstadien-3$\beta$,17$\beta$-diol diacetate.

A mixture of 10 g. of $\Delta^{5,7}$-androstadiene-3$\beta$,17$\beta$-diol diacetate in 200 ml. of neutral ethyl acetate is hydrogenated with 1 g. of platinum oxide catalyst until the uptake of hydrogen is constant. This requires about 35 minutes. The catalyst is removed by filtration, and the ethyl acetate evaporated under reduced pressure. The solid residue is recrystallized three times from dilute methanol. The $\Delta^{7}$-androstene-3$\beta$,17$\beta$-diol diacetate weighs 8.17 g.

The $\Delta^{7}$-androstene-3$\beta$,17$\beta$-diol diacetate obtained above is refluxed one-half hour with 125 ml. of 5% alcoholic potassium hydroxide and then 75 ml. of water is added. Gradual cooling overnight gives crystals which are collected and washed with dilute ethanol. The $\Delta^{7}$-androstene-3$\beta$,17$\beta$-diol weighs 1.54 g. Two recrystallizations from methanol to constant melting point gives 1.1 g. of the pure diol.

To a refluxing solution of 0.21 g. of $\Delta^{7}$-androstene-3$\beta$,17$\beta$-diol in ethanol is added a hot solution of 0.76 g. of mercuric acetate in ethanol acidified with 0.2 ml. of glacial acetic acid. The total volume of ethanol used for both solutions is 20 ml. of alcohol. The mixture is refluxed for 2 hours, cooled and filtered. The filtrate is evaporated under reduced pressure and the residue is dissolved in acetone and filtered. The acetone solution is concentrated with simultaneous addition of methanol until no more acetone is present. The methanol solution is concentrated and treated with water. This gives the crude $\Delta^{7,9}$-diol. Recrystallization from dilute methanol gives pure $\Delta^{7,9}$-androstadiene-3$\beta$,17$\beta$-diol, melting point 203°–205° C.;

$\lambda_{\text{maximum}}^{\text{absolute alcohol}}$ 235 and 243 m$\mu$

*Example 2*

A solution of 80 mg. of $\Delta^{7,9}$-androstadiene-3$\beta$,17$\beta$-diol in 1 ml. of pyridine is treated in the cold with 0.5 ml. of acetic anhydride and the mixture is allowed to stand for 60 hours. It is then acidified in the cold with dilute acetic acid and the product is worked up in benzene. The extract is washed successively with dilute acetic acid, water, sodium bicarbonate solution and finally with water, dried with magnesium sulfate and evaporated under reduced pressure. The crystalline residue is recrystallized several times from dilute methanol to give melting point 123°–126° C.;

$\lambda_{\text{maximum}}^{\text{absolute alcohol}}$ 235, 242 and 250.5–251 m$\mu$

*Example 3*

A solution of 80 mg. of $\Delta^{7,9}$-androstadiene-3$\beta$,17$\beta$-diol in 1 ml. of pyridine is treated in the cold with 1.5 ml. of benzoyl chloride and the mixture is allowed to stand 85 hours at room temperature. Cold dilute acetic acid is added and the product is worked up in benzene. The extract is washed with dilute acetic acid, water, sodium bicarbonate solution and water and dried with magnesium sulfate, treated with animal charcoal and filtered. Evaporation under reduced pressure gives an oil which crystallized on the addition or methanol, melting point 203°–205° C. Recrystallization from methanol-ether gives pure $\Delta^{7,9}$-androstadiene-3$\beta$,17$\beta$-diol dibenzoate, melting point 210°–212° C.;

$\lambda_{\text{maximum}}^{\text{absolute alcohol}}$ 233, 273 and 280 m$\mu$

We claim:

1. Compounds having the general formula:

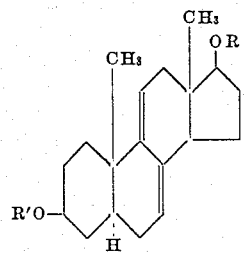

in which R and R' are members of the group consisting of hydrogen, lower alkyl carbonyl and benzoyl radicals.

2. Compounds having the general formula:

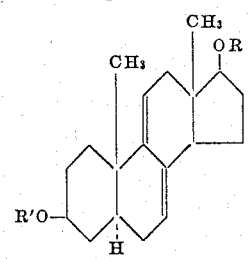

in which R and R' are lower alkyl carbonyl radicals.

3. $\Delta^{7,9}$-Androstadiene-3$\beta$,17$\beta$-diol.
4. $\Delta^{7,9}$-Androstadiene-3$\beta$,17$\beta$-diol diacetate.
5. $\Delta^{7,9}$-Androstadiene-3$\beta$,17$\beta$-diol dibenzoate.

6. A method of preparing compounds having the general formula:

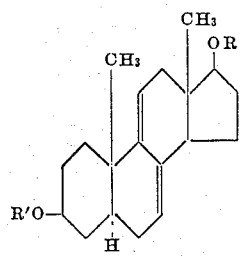

in which R and R' are members of the group consisting of hydrogen, lower alkyl carbonyl and benzoyl radicals which comprises heating the corresponding $\Delta^{7}$-androstene with mercuric acetate and acetic acid in the presence of a lower aliphatic alcohol and recovering said product therefrom.

7. A method of preparing compounds having the general formula:

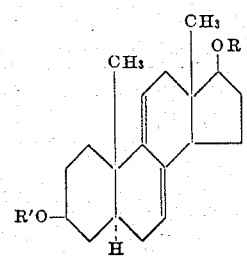

in which R and R' are lower alkyl carbonyl radicals which comprises heating the corresponding $\Delta^7$-androstene with mercuric acetate and acetic acid in the presence of a lower aliphatic alcohol and recovering said compound therefrom.

8. A method of preparing $\Delta^{7,9}$-androstadiene-$3\beta,17\beta$-diol which comprises heating $\Delta^7$-androstene-$3\beta,17\beta$-diol with mercuric acetate and acetic acid in the presence of a lower aliphatic alcohol and recovering said product therefrom.

9. A method of preparing $\Delta^{7,9}$-androstadiene-$3\beta,17\beta$-diol diacetate which comprises heating $\Delta^7$-androstene-$3\beta,17\beta$-diol diacetate with mercuric acetate and acetic acid in the presence of a lower aliphatic alcohol and recovering said product therefrom.

SEYMOUR BERNSTEIN.
DOMINIC J. GIANCOLA.

No references cited.